United States Patent
Bogacz et al.

(10) Patent No.: US 12,406,435 B1
(45) Date of Patent: Sep. 2, 2025

(54) SYSTEMS AND METHODS FOR ADAPTIVE STREAMING OF POINT CLOUDS

(71) Applicant: Illuscio, Inc., Culver City, CA (US)

(72) Inventors: Joseph Bogacz, Perth (CA); Margaret Falconer Corrigall, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/591,402

(22) Filed: Feb. 29, 2024

(51) Int. Cl.
G06T 17/00 (2006.01)

(52) U.S. Cl.
CPC .................. G06T 17/00 (2013.01)

(58) Field of Classification Search
None
See application file for complete search history.

(56) References Cited

U.S. PATENT DOCUMENTS

| | | | | |
|---|---|---|---|---|
| 2021/0019936 | A1* | 1/2021 | Oyman | G06T 9/001 |
| 2023/0119626 | A1* | 4/2023 | Bhadula | H04N 13/117 |
| | | | | 348/47 |
| 2023/0370666 | A1* | 11/2023 | Dawkins | H04N 21/21805 |

* cited by examiner

Primary Examiner — Peter Hoang
(74) Attorney, Agent, or Firm — Ansari Katiraei LLP; Arman Katiraei; Sadiq Ansari

(57) ABSTRACT

A streaming system and associated methods provide adaptive streaming of point cloud data for out-of-order presentation of important visual features before less important visual features. The adaptive streaming includes retrieving the points for a requested point cloud, differentiating different sets of points that represent different features in the point cloud, prioritizing each set of points based on a feature that is represented by that set of points, and streaming the different sets of points across a data network to a client device in an order that is determined from the prioritization. Moreover, the adaptive streaming may dynamically select a different subset of points from each set of points and different subset of point data to stream with each selected subset of points to visually convey important detail of each feature without all the corresponding points or data that make up that feature in the point cloud.

20 Claims, 8 Drawing Sheets

SYSTEMS AND METHODS FOR ADAPTIVE STREAMING OF POINT CLOUDS

BACKGROUND

Adaptive streaming is a technique that adjusts the quality of content as the content is transferred over a data network with changing network conditions. The adaptive streaming allows the receiving device to receive an image, animation, video stream, or other content using the bandwidth or resources that are available. For instance, the adaptive streaming may involve decreasing or increasing the resolution of an image, animation, video stream, or other content in response to changing network congestion, latency, jitter, bandwidth, and/or other changing network and hardware resource availability.

The same adaptive streaming techniques may be used to stream three-dimensional (3D) content. To do so, the 3D content is converted or rendered as a two-dimensional (2D) image or frame on the sender side, and the resolution of that 2D image or frame may be dynamically adjusted when streaming to the receiving client device according to the network conditions and/or available resources. However, there are instances when the original 3D data of the 3D content, and not the converted 2D rendering of the 3D content, is requested or required by the receiving device. In such instance, the existing adaptive streaming techniques cannot be used. Accordingly, there is a need for new adaptive streaming techniques for transferring 3D content in its original form over data networks with variable network conditions and/or resource availability.

DETAILED DESCRIPTION OF PREFERRED EMBODIMENTS

The following detailed description refers to the accompanying drawings. The same reference numbers in different drawings may identify the same or similar elements.

Disclosed are systems and associated methods for adaptive streaming of point clouds. The adaptive point cloud streaming includes selectively streaming points (e.g., original three-dimensional (3D) data of a point cloud) for an out-of-order presentation of points that represent important features of the one or more 3D objects represented by the point cloud before presenting points that represent lesser important features, background features, or other features of the point cloud. The selective streaming may conserve bandwidth and/or resources by transmitting a dynamically selected subset of the points for a particular feature that visually convey the particular feature with less than all the points of the particular feature. In other words, the selective streaming includes determining which subset of points represent the differentiating details or visual characteristics of the particular feature, and streaming those points rather than all points of the particular feature to initially produce a partial visual representation of the particular feature on the receiving client device.

If time and/or resources permit, the adaptive point cloud streaming includes streaming the points for the lesser important features after the points for the important features and/or streaming the remaining points to supplement the subset of points for the partial visual representation of the features previously streamed to the receiving client device. Otherwise, the adaptive point cloud streaming includes streaming the points for the important features of a next frame of an animation, video, or stream and not streaming the points for the lesser important features or the remaining points of the previous frame.

To further conserve bandwidth, the selective streaming may include providing partial data for the selectively streamed points and/or points representing the important features, and subsequently streaming the remaining data for the selectively streamed points if time and/or resources permit. For instance, the points representing the important features may be streamed with their positional data and with a single color value or no color values so that the shape and form of those features may be presented on the receiving device with inaccurate color information or no color information. The color values for individual color components (e.g., red, green, and blue color values) may be subsequently streamed to the receiving device, and the receiving device may increase the detail or color accuracy of the previously received points by updating the visualization of those points to include the subsequently arriving color values.

Figure 1:
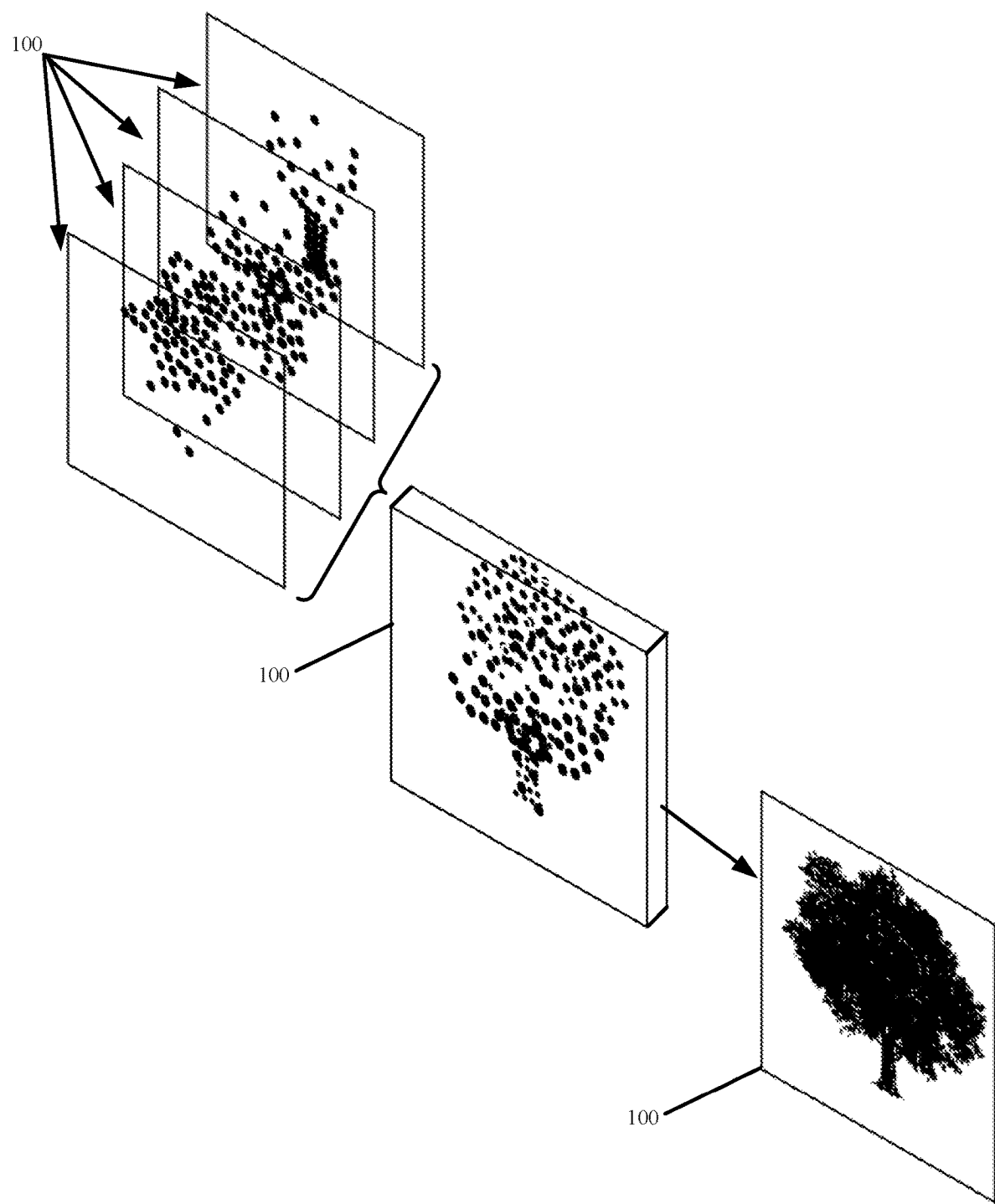
FIG. 1 illustrates an example point cloud in accordance with some embodiments presented herein.

FIG. 1 illustrates an example point cloud 100 in accordance with some embodiments presented herein. Point cloud 100 may represent a 3D object or a 3D scene with primitives that correspond to points distributed in a 3D space. The primitives or points collectively generate the shape and visual characteristics of the represented 3D object or the 3D scene.

The points of point cloud 100 differ from pixels of a 2D image because certain regions of point cloud 100 may have no points, lower densities of points, and/or higher densities of points based on varying amounts of visual information that is defined, detected, or scanned at those regions. Additionally, the position of the point cloud points may be defined in 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D environment in the 3D space.

The positional elements may also include a surface normal. The surface normal defines the angle, direction, or orientation that the surface, feature, or article of the 3D object or the 3D environment represented by the point cloud point faces or is exposed to. More specifically, the surface normal for a particular point is a line, ray, or vector that is perpendicular to the surface, feature, or article represented by that particular point.

The non-positional elements may include information about the detected characteristics of the surface, feature, or article imaged at a corresponding position in the 3D space. The characteristics may correspond to a detected color. The color may be represented using red, green, blue (RGB), and/or other values. In some embodiments, the characteristics may provide the chrominance, hardness, translucence, reflectivity, luminance, metallic characteristics, roughness, specular, diffuse, albedo, index of refraction (IOR), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

Accordingly, each point cloud point may include or may be defined with an array of elements. The array of elements may provide the positioning of the point in the 3D space as well as one or more visual characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other non-positional values.

Point cloud 100 and the individual points of point cloud 100 may be generated by a 3D or depth-sensing camera, Light Detection and Ranging (LiDAR) sensor, Magnetic Resonance Imaging (MRI) device, Positron Emission Tomography (PET) scanning device, Computerized Tomography (CT) scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100.

Figure 2:
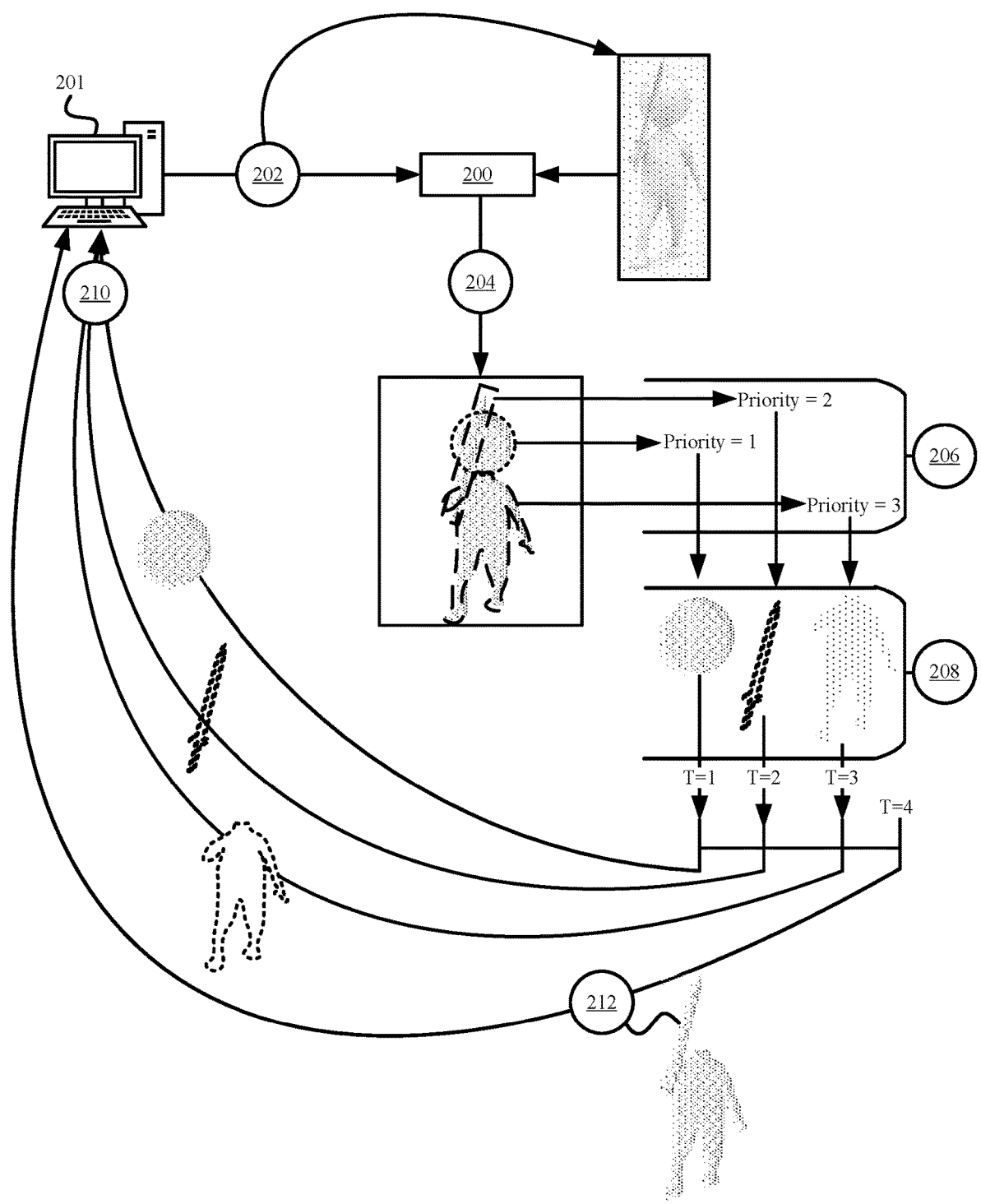
FIG. 2 illustrates an example of adaptively streaming a point cloud by selectively streaming different sets of points from the point cloud in accordance with some embodiments presented herein.

FIG. 2 illustrates an example of adaptively streaming a point cloud by selectively streaming different sets of points from the point cloud in accordance with some embodiments presented herein. Streaming system 200 receives (at 202) a request for remote access to a point cloud that is hosted by or is accessible from streaming system 200. Client device 201 issues the request to streaming system 200 over a data network via a supported network message type. For instance, the request may be issued as HyperText Transfer Protocol (HTTP) GET request.

Streaming system 200 differentiates (at 204) sets of points that represent different features of the point cloud. For instance, streaming system 200 detects a first set of points representing a character face as a first feature, a second set of points representing an inanimate object (e.g., a sword) as a second feature, and a third set of points representing a body of the character as a third feature.

Streaming system 200 prioritizes (at 206) the differentiated (at 204) sets of points based on a classification of the feature represented by each set of points. Prioritizing (at 206) the differentiated (at 204) sets of points may include assigning a priority value based on an importance associated with the classified feature. The prioritization (at 206) may determine the order with which streaming system 200 streams the different sets of points to client device 201.

Streaming system 200 dynamically selects (at 208) a subset of points from each differentiated (at 204) set of points to initially stream to receiving device 201 based on the feature classification. Specifically, streaming system 200 selects (at 208) the subset of points that provide sufficient or necessary detail to visually make out the feature. For instance, streaming system 200 may select (at 208) all points for the character face, points for the outline of the inanimate object, and points about the front surface of the body. Points that fill in the form of the inanimate object and points that form the sides and back of the body may be classified as having lesser importance and may be selected for streaming at a later time (e.g., after the dynamically selected (at 208) subset of points have been streamed to client device 201).

Streaming system 200 streams (at 210) the first subset of points representing the character face before the second subset of points representing the outline of the inanimate object before the third subset of points representing the front surface of the character body to client device 201. If time and/or resources permit, streaming system 200 subsequently streams the remaining points that fill-out the inanimate object and the remaining points for the different sides of the character body. This selective streaming (at 210) of prioritized points causes client device 201 to receive the original 3D data for different parts or features of the point cloud out-of-order rather than receive a converted 2D rendering of the point cloud at different resolutions from existing adaptive streaming techniques.

Client device 201 may render a first visualization based on the first subset of points, may generate a second visualization by updating the first visualization to include the rendering of the second subset of points upon receiving the second subset of points, and may generate a third visualization by rendering the third subset of points to include with the rendering of the first and second subsets of points. In this manner, client device 201 generates an initial and partial visualization of the point cloud that presents important features before other features. Accordingly, even if network conditions are poor, bandwidth is low, or available resources for streaming and/or rendering the point cloud are low, streaming system 200 provides client device 201 with the most pertinent visual data that allows client device 201 to construct a visualization containing the prioritized or important features of the represented 3D object or 3D scene without waiting to receive all points or data of the point cloud.

If time, network conditions, or resource availability permit, streaming system 200 streams (at 212) other point cloud points representing remaining points, lesser important features, or points with the next highest priority to client device 201. For instance, the requested point cloud may be part of a video, animation, or game, and streaming system 200 may have a limited time with which to stream the points for each frame of the video, animation, or game. Moreover, client device 201 may provide input that changes the point cloud field-of-view or points of the point cloud that are to be presented. For instance, client device 201 may provide input that changes a position of a virtual camera within the 3D space of the point cloud, and the changing position of the virtual camera may change the field-of-view causing a new or different region of the point cloud to be requested and/or viewed. If the input changing the virtual camera position is provided before streaming system 200 has completed sending the data for all points in the last field-of-view, streaming system 200 will halt sending the data for the remaining points in the last field-of-view, and will begin selectively sending the points for the changed or current field-of-view. Specifically, streaming system 200 may classify the features represented by the points in the current field-of-view and selectively stream the points representing the important features in the current field-of-view before streaming the points representing other or lesser important features.

Figure 3:
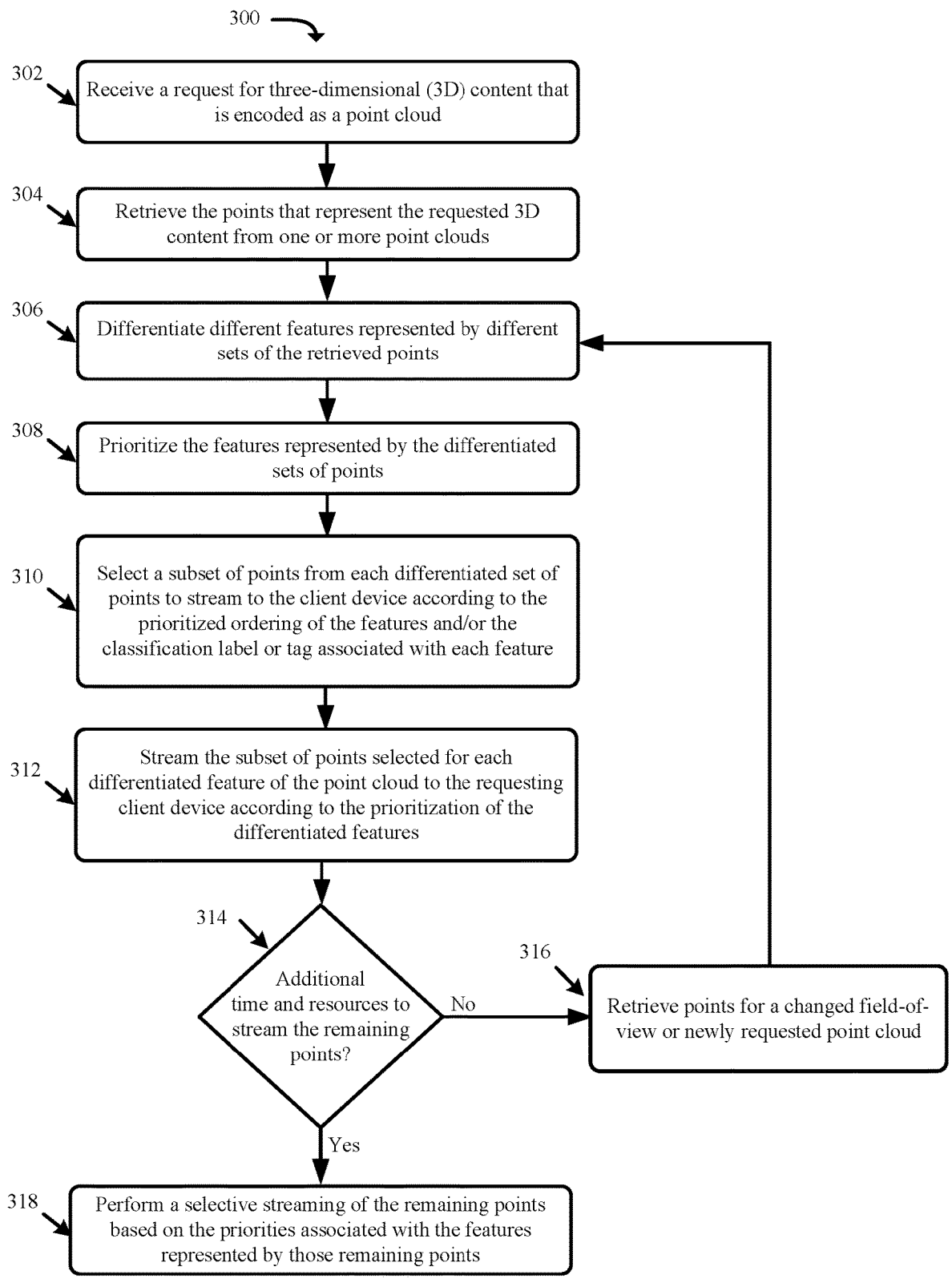
FIG. 3 presents a process for performing the adaptive point cloud streaming in accordance with some embodiments presented herein.

FIG. 3 presents a process 300 for performing the adaptive point cloud streaming in accordance with some embodiments presented herein. Process 300 is implemented by streaming system 200.

Streaming system 200 may include one or more devices or machines with processor, memory, storage, network, and/or other hardware resources that provide remote client devices access to different point clouds that are hosted by streaming system 200. In some embodiments, streaming system 200 may correspond to a provider of live or on-demand content with some or all of the content being 3D content encoded as one or more point clouds. In some embodiments, streaming system 200 provides client devices access to collaboration or conferencing services in which 3D feeds of different participants are presented as the adaptively streamed point cloud. In some embodiments, streaming system 200 is a remote gaming service for 3D games that are presented as a point cloud or that include 3D assets that are encoded as point clouds. In some embodiments, streaming system 200 generates and streams spatial computing experiences (e.g., mixed reality, virtual reality, augmented reality, etc.) as one or more point clouds.

Process 300 includes receiving (at 302) a request for 3D content that is encoded as a point cloud. In some embodiments, the requested 3D content is a video, animation, or game. In some other embodiments, the requested 3D content is for a particular field-of-view in a 3D scene or environment. For instance, the request may specify a position from which to render the particular field-of-view in a 3D space of a point cloud.

Process 300 includes retrieving (at 304) the points that represent the requested 3D content from one or more point clouds. Streaming system 200 may retrieve (at 304) all points from the one or more point clouds when the one or more point clouds represent assets to be rendered in a game, video frame, or other 3D environment. Alternatively, streaming system 200 may retrieve (at 304) less than all the points from the one or more point clouds when the requested 3D content is for a particular field-of-view or region of space within a larger space spanned by the points of the one or more point clouds.

Process 300 includes differentiating (at 306) different features represented by different sets of the retrieved (at 304) points. Streaming system 200 may perform the feature differentiation using one or more techniques.

In some embodiments, streaming system 200 locally renders the retrieved (at 304) points and performs feature recognition across the generated image. In some such embodiments, streaming system 200 may use different artificial intelligence and/or machine learning (AI/ML) techniques to detect or differentiate the different features that are formed in the visualization from different sets of points. For instance, a first AI/ML technique may be used to detect humans and other characters in the visualization produced from the retrieved (at 304) points, and a second AI/ML technique may be used to detect inanimate objects in the visualization produced from the retrieved (at 304) points.

In some embodiments, streaming system 200 differentiates (at 306) different sets of points from the retrieved (at 304) points based on positional or visual characteristic commonality shared between the points in each differentiated set of points. For instance, a first set of points may have the coloring and structural arrangement that is consistent with a human head, and streaming system 200 may group and/or differentiate (at 306) the first set of points based on the detected commonality amongst the first set of points. Similarly, a second set of points may have the coloring and structural arrangement that is consistent with a building, and streaming system 200 may group and/or differentiate (at 306) the second set of points based on the detected commonality amongst the second set of points.

In some embodiments, differentiating (at 306) the features may include associating a classification tag or label to each set of differentiated points. The classification tag or label identifies the feature that is represented by that set of differentiated points. The classification tag or label may be an alphanumeric string or numeric value. In some embodiments, streaming system 200 is configured or trained to recognize variations of millions of differentiate features with each differentiated feature being associated with a unique identifier that is the classification tag or label for that feature.

Process 300 includes prioritizing (at 308) the features represented by the differentiated sets of points. The prioritization (at 308) may include assigning a value to each set of points that indicates the order with which that set of points is to be streamed to the requesting client device. The prioritization (at 308) and/or assigned value indicates the importance of the feature relative to other features in the field-of-view of the requested point cloud.

The prioritization (at 308) may be based on a mapping between the classification tags or labels that are associated with the different sets of points during the differentiation (at 306) and/or the different assigned priorities. For instance, human forms and, specifically, human faces may be prioritized with a first level of importance or streaming precedence, inanimate objects may be prioritized with a second level of importance or streaming precedence, foreground features may be prioritized with a third level of importance or streaming precedence, and background features may be prioritized with a fourth level of importance or streaming precedence. Foreground features may include point cloud points that are not classified to be an animate or inanimate object and/or that have z-depth coordinates that places the points in the near plane of the field-of-view, and background features may include point cloud points that are not classified to be an animate or inanimate object and/or that have z-depth coordinates that places the points in the far plane of the field-of-view.

In some embodiments, the prioritization (at 308) may be modified according to an overall classification of the point cloud or requested 3D content. For instance, streaming system 200 may place greater importance on humans and human faces than other features in point clouds that represent 3D photos, whereas streaming system 200 may place greater importance on environmental objects for point clouds that are used to generated virtual reality or spatial computing experiences.

In some embodiments, streaming system 200 may derive the priorities that are assigned to the different features by monitoring user viewing behavior and dwell time on the same features in other point clouds, images, or scenes. In some such embodiments, streaming system 200 tracks user eye focus and/or eye movements to determine which features of a presented image the user focuses on first and/or how much time the user spends viewing each feature. In some other embodiments, the priorities may be predefined or preconfigured.

In some embodiments, the feature differentiation, classification, and/or prioritization is performed prior to receiving the request for the point cloud and/or adaptively streaming the point cloud. In some such embodiments, streaming system 200 may perform the feature differentiation, classification, and/or prioritization for points of a point cloud before receiving a request to stream that point cloud. Streaming system 200 may tag the point clouds with a feature classification and/or a priority to specify the order with which the points should be streamed. The feature classification and/or priority may be stored as non-positional elements of the points. For instance, a particular point may be defined with a first non-positional element with a first value that indicates the feature classification (e.g., character face) and a second non-positional element with a second value for the priority associated with the feature classification (e.g., a value between 0-10).

Process 300 includes selecting (at 310) a subset of points from each differentiated set of points to stream to the client device according to the prioritized ordering of the features and/or the classification label or tag associated with each feature. In other words, streaming system 200 does not simply stream all points representing a differentiated feature at one time and/or does not randomly sample and stream points representing a differentiated feature. Instead, streaming system 200 determines the subset of points that convey the most detail for the represented feature with the fewest points, and streams that subset of points first so that the viewer is able to visually identify the feature from a visualization that is generated with fewer than all points of the feature. Selecting the subset of points instead of all points for a represented feature preserves bandwidth that streaming system 200 may allocate to stream the subset of points for other differentiated features according to the prioritized ordering. If time and resources remain, streaming system 200 streams the remaining points to fill in the detail for each of the features in the requested 3D content.

Streaming system 200 selects (at 310) the subset of points based on the classification tag or label that is associated with the set of points for the differentiated feature. For instance, streaming system 200 selects (at 310) the subset of points forming the eyes, nose, and mouth for a differentiated feature of a character face, selects (at 310) the subset of points forming the edges of an inanimate object in the foreground, and selects (at 310) the subset of points forming the outline of a differentiated background feature. Accordingly, streaming system 200 may select different subsets of points for each feature depending on which points best convey the important or differentiating aspects of that feature.

In some embodiments, each classification label or tag may be associated with selection criteria for the subset of points to stream first and initially represent the differentiated feature. Streaming system 200 analyzes the set of points representing a differentiated feature according to the selection criteria, and selects (at 310) the subset of points with positional coordinates or visual characteristics that satisfy or match the selection criteria. For instance, the selection criteria for a first classification label or tag may specify selecting the points at the border or outline of the differentiated feature. Accordingly, streaming system 200 may analyze the positional coordinates defined for each point of the set of points representing the differentiated feature to identify and select (at 310) the subset of points that have the outermost positions in the set of points (e.g., a point in the set of points that is not bordered on two sides or in between two other points in the set of points). Selection criteria for a second classification label or tag may specify selecting the points that form the outer front-facing surface of the feature. In this case, streaming system 200 may analyze the positional coordinates defined for each point of the set of points representing the differentiated feature to identify and select (at 310) the subset of points that are not obscured about the z-plane by another point.

Process 300 includes streaming (at 312) the subset of points selected for each differentiated feature of the point cloud to the requesting client device according to the prioritization (at 308) of the differentiated features. Accordingly, streaming system 200 performs an out-of-order, non-random, and selective distribution of the points from the requested point cloud. Moreover, the streamed (at 312) subset of points provide a dynamic and intelligent sampling of the point cloud points that is based on the differentiation, classification, and mapping of the points to different features with the dynamic and intelligent sampling producing the most recognizable visualization of the requested 3D content with the fewest points. The dynamic and intelligent sampling is in contrast to techniques that may perform a uniform sampling across all point cloud points in order to produce a gradual filling in of the point cloud points. For instance, other techniques may distribute every Nth point across a plane (e.g., every fourth point along each x-plane spanned by the point cloud points), and may produce a partial visualization of the 3D content. However, the uniform sampling does not prioritize the points that distinguish a feature from other points of that feature and also does not prioritize the streaming of points for important features before points of unimportant features as does the adaptive point cloud streaming performed by streaming system 200. With reference to FIG. 2, streaming system 200 streams the points that provide an outline of the sword since the sword outline is sufficient to visually convey that feature. Points that form the sword interior and/or that provide detail to the sword blade are less important and may be streamed at a later time if time and resources permit. Conversely and with continued reference to FIG. 2, streaming system 200 streams the points that form the front facing surface of the character body since that aspect of the character body provides the most important detail for the viewer to make out what that feature represents (e.g., the character body). Points that give dimension to the character body and that form the sides and back of the character body are less important and may be streamed at a later time if time and resources permit.

Process 300 includes determining (at 314) whether additional time and resources are available to stream the remainder of the points for the requested field-of-view or requested 3D content. The time determination (at 314) may be based on whether the field-of-view or scene changes whether because of user input or because of the rate at which different frames of animation or video are to be presented. The resource determination (at 314) may be based on the receiving client device indicating that it has sufficient available resources to receive, process, and/or render more points.

In response to determining (at 314—No) that the field-of-view or the requested 3D content has changed (e.g., no additional time or resources are available to stream the remaining points for the last requested field-of-view or 3D content), process 300 includes repeating the selectively streaming of points for the new field-of-view or newly requested 3D content. For instance, process 300 may repeat or restart by retrieving (at 316) points for a newly requested or changed field-of-view or point cloud.

In response to determining (at 314—Yes) that the field-of-view or the requested 3D content has not changed and that there is additional time and resources available to stream the remainder of the points for the last requested field-of-view or 3D content, process 300 includes performing (at 318) a selective streaming of the remaining points based on the priorities associated with the features represented by those remaining points. In some embodiments, performing (at 318) the selective streaming of the remaining points includes distributing the remaining points from the set of points representing the highest priority differentiated features before distributing any points of differentiated features with a next highest priority. In some embodiments, performing (at 318) the selective streaming of the remaining points includes distributing the remaining points according to the priorities of the differentiated features represented by those points after having streamed the subset of points selected for each of the differentiated features using the selection criteria associated with each feature.

In some embodiments, streaming system 200 may dynamically adjust the points selected for the adaptive streaming based on changing network conditions and resource availability. For instance, streaming system 200 may select and initially stream the points for the outline of a differentiated feature in response to detecting poor network conditions or limited resource availability, and may select and initially stream the points for the outline of the differentiated feature as well every third point inside the outline in response to detecting good network conditions or abundant resource availability.

Figure 4:
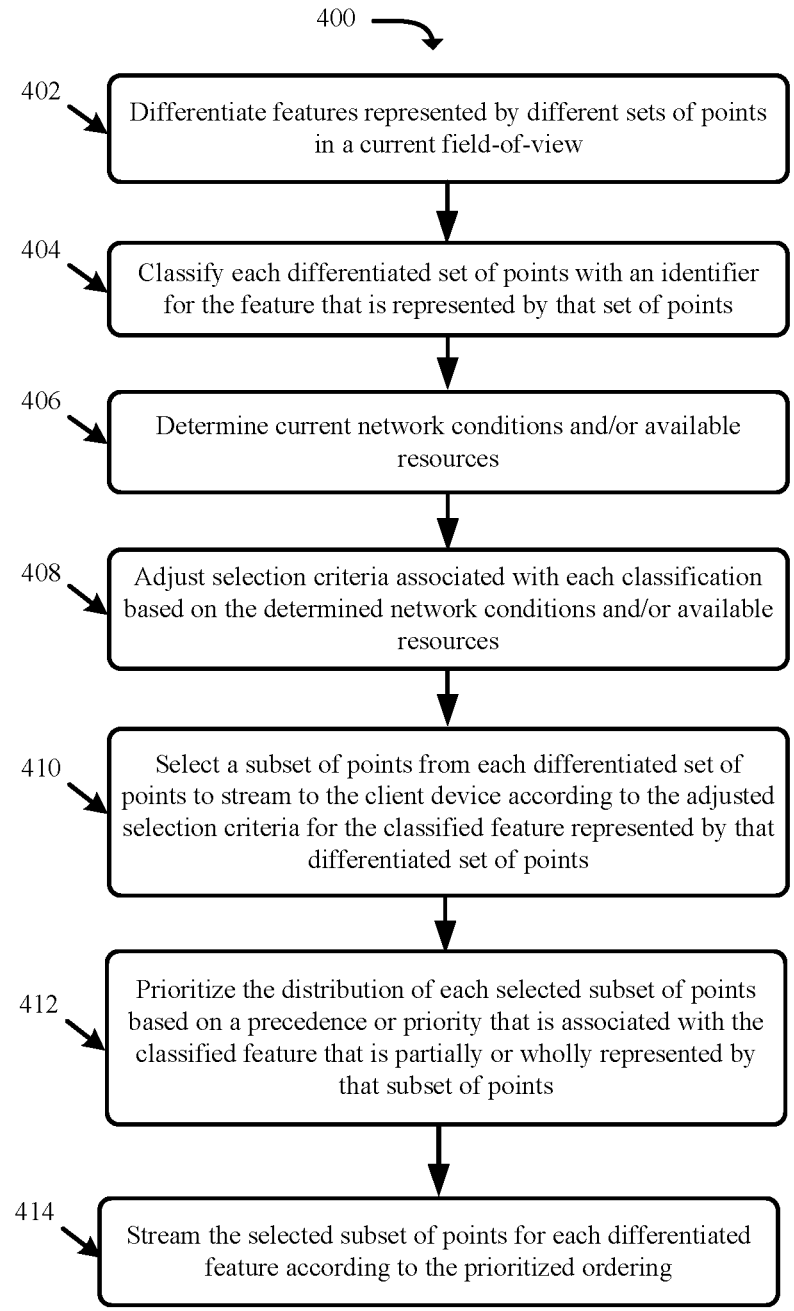
FIG. 4 presents a process for dynamically adjusting the adaptive point cloud streaming in accordance with some embodiments presented herein.

FIG. 4 presents a process 400 for dynamically adjusting the adaptive point cloud streaming in accordance with some embodiments presented herein. Process 400 is implemented by streaming system 200.

Process 400 includes differentiating (at 402) features represented by different sets of points in a current field-of-view. Streaming system 200 performs the differentiation (at 402) by detecting or recognizing shapes, patterns, and/or forms of features that are generated by the different set of points or by identifying positional and/or visual commonality that is unique to each set of points and by mapping that commonality to a recognized feature.

Process 400 includes classifying (at 404) each differentiated set of points with an identifier for the feature that is represented by that set of points. The identifier may be added as metadata or as a non-positional value of the points.

Process 400 includes determining (at 406) current network conditions and/or available resources. The network conditions may include one or more of the amount of congestion, latency, jitter, round-trip-time, bandwidth, packet loss, and/or other factors associated with transmitting data packets over a network path that connects streaming system 200 with the requesting client device. Network conditions may fluctuate depending on the amount of traffic on the network path, network equipment routing the data, and/or bandwidth supported over the network path. The available resources may correspond to the hardware resources (e.g., processors, memory, storage, etc.) of the requesting client device and the number of points that the requesting client device is able to receive, process, and/or render with the hardware resources. For instance, the rate at which streaming system 200 streams point cloud points to an older client device may exceed the rate at which the older client device is able to process and/or render those points.

Process 400 includes adjusting (at 408) selection criteria associated with each classification based on the determined (at 406) network conditions and/or available resources. The selection criteria may specify which points representing a feature are the important points or subset of points for visually distinguishing that feature. Adjusting (at 408) the selection criteria may include increasing or decreasing the number of points that may be selected to visually distinguish the feature and/or changing which of the points are selected. For poor network conditions or limited available resources, the selection criteria is adjusted (at 408) to select the fewest number of points that visually distinguish a represented feature. In other words, the selection criteria is adjusted (at 408) to select the most important or visually differentiating points for a represented feature. This may include points that convey the feature outline, border, or edges. As network conditions improve or more resources become available, the selection criteria is adjusted (at 408) to include additional visually distinguishing points. For instance, streaming system 200 may adjust (at 408) the selection criteria so that more points representing the outline, border, or edges of a feature are included along with various points within the interior of the feature or points that add detail about the exterior, outer surface, or other surfaces of the feature.

Process 400 includes selecting (at 410) a subset of points from each differentiated set of points to stream to the client device according to the adjusted selection criteria for the classified feature represented by that differentiated set of points. Streaming system 200 selects (at 410) fewer points with which to initially stream and generate an initial visualization for each differentiated feature in response to worse network conditions or fewer available resources and more points with which to initially stream and generate an initial visualization for each differentiated feature in response to improved network conditions (e.g., more bandwidth, less latency, etc.) and/or more available resources (e.g., faster processor, more memory, etc.).

Process 400 includes prioritizing (at 412) the distribution of each selected (at 410) subset of points based on a precedence or priority that is associated with the classified (at 404) feature that is partially or wholly represented by that subset of points. Process 400 includes streaming (at 414) the selected (at 410) subset of points for each differentiated feature according to the prioritized (at 412) ordering.

In some embodiments, the adaptive point cloud streaming involves sending partial point data at a first time and the remainder of the point data at a later time. For instance, streaming system 200 may perform a prioritized or out-of-order distribution of the positional elements or coordinates for the points before performing a prioritized or out-of-order distribution of the non-positional elements or color values for the points.

The receiving client device may receive the positional elements or coordinates without any color information, and may generate a first visualization in which the points for different features or objects streamed at different times are rendered with uniform coloring, default coloring, different basic colors, or different shading. Once the receiving client device receives the color values for the points, the receiving client device may update the first visualization by adding colors defined for each point to the visualization. In some embodiments, the adaptive streaming of partial point data may include sending a single color value or a basic color value with the positional data before sending detailed color values, different color components, and/or other non-positional data for each point.

The adaptive streaming of partial point data allows the receiving client device to generate a quick visualization of the requested field-of-view or point cloud that provides the viewer with the correct shapes and forms of the features or objects within the requested field-of-view or point cloud without accurate or detailed colors. The adaptive streaming of partial point data reduces the amount of data that is initially streamed for each point of the point cloud. In doing so, streaming system 200 is able to distribute more points of the point cloud to the receiving client device with lower bandwidth and/or less total data than if streaming the points with the complete set of positional and non-positional data that is defined for each of the streamed points.

Figure 5:
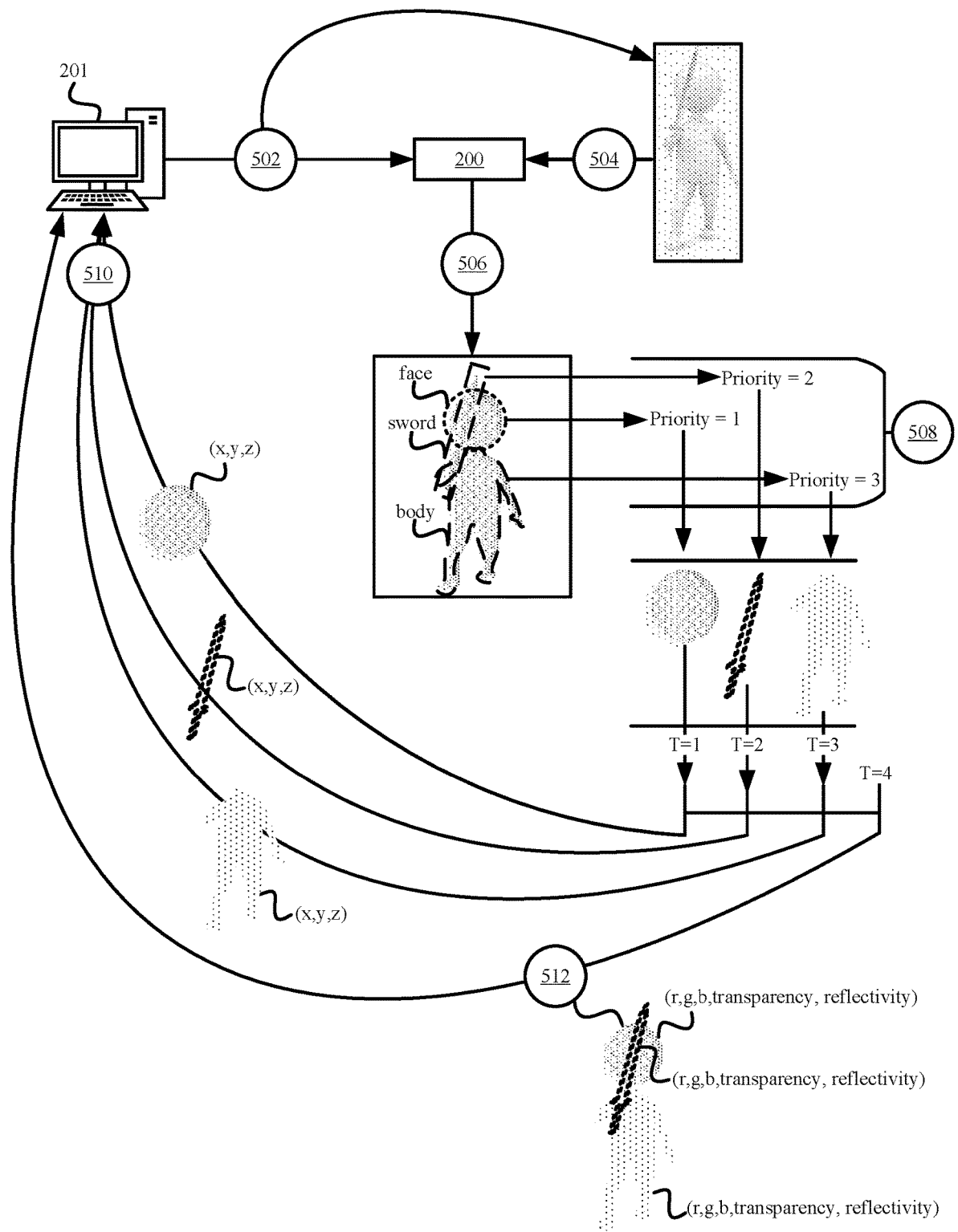
FIG. 5 illustrates an example of the adaptive streaming of partial point data in accordance with some embodiments presented herein.

FIG. 5 illustrates an example of the adaptive streaming of partial point data in accordance with some embodiments presented herein. Streaming system 200 receives (at 502) a request for access to a particular point cloud or a field-of-view in the particular point cloud from client device 201.

Streaming system 200 retrieves (at 504) the points for the particular point cloud or the requested field-of-view, classifies (at 506) the features that are represented by different sets of the points, and prioritizes (at 508) the order with which to distribute the different sets of points to client device 201 based on different priorities associated with the classified (at 506) features. Streaming system 200 streams (at 510) partial data rather than all data for each of the points according to the prioritized (at 508) order to client device 201 in response to the request. Streaming (at 510) the partial data includes transmitting the positional data for each point to client device 201 without any data for the colors, transparency, reflectivity, and other non-positional elements defined for those points. In some embodiments, each point may be associated with an index or a numeric value to identify that point.

Once streaming system 200 completes streaming (at 510) the partial data for the points to client device 201 and if time and/or resources permit, streaming system 200 streams (at 512) the remaining data for each of the points according to the prioritized (at 508) order to client device 201. In this example, the remaining data includes sending the colors, transparency, reflectivity, and other non-positional element data for the points. For instance, streaming system 200 streams (at 512) different bytes for each of several color components (e.g., red, green, and blue) that accurately define a point's color, transparency values, reflective values, chrominance values, and/or other values that provide a detailed definition of the visual characteristics for a point. Streaming system 200 may stream (at 512) the remaining point data for a particular point with the same index that was used in streaming (at 510) the positional data for that particular point, and client device 201 may associate or add the remaining point data to the particular point based on the index.

Client device 201 may render a first visualization upon receiving the partial data for the points from streaming system 200 over a first time. In some embodiments, the first visualization may contain the subsets of points that represent the important parts of the determined features in the point cloud or field-of-view with minimal or no non-positional data for the subsets of points. In some embodiments, the first visualization may contain all points for the requested point cloud or field-of-view with minimal or no non-positional data for the points.

Figure 6:
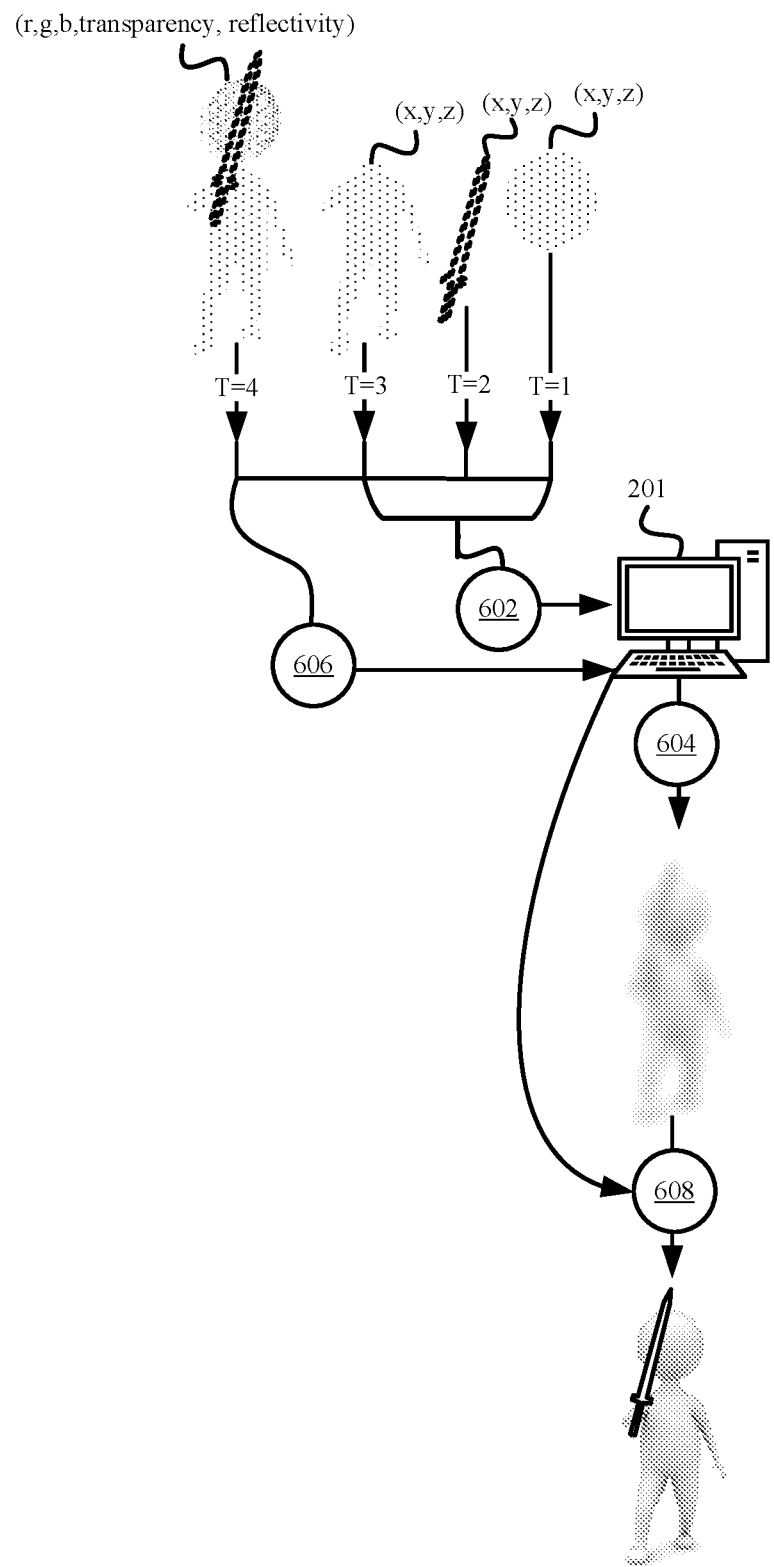
FIG. 6 illustrates an example of rendering a point cloud based on the adaptive streaming of partial point data in accordance with some embodiments presented herein.

FIG. 6 illustrates an example of rendering a point cloud based on the adaptive streaming of partial point data in accordance with some embodiments presented herein. Client device 201 receives (at 602) the positional data for different subsets of points representing different classified and prioritized features in a field-of-view at a first time. No visual characteristics or color information is provided for the different subsets of points at the first time.

Client device 201 generates (at 604) a first visualization based on the positional data provided for the different subsets of points. Client device 201 may render each subset of points representing a different feature with a different uniform color so that the features are distinguishable from one another. For instance, streaming system 200 streams each subset of points for a different feature so that client device 201 is able to identify and assign the different uniform color to that subset of points. Alternatively, client device 201 may render each subset of points with the same uniform color. In any case, the first visualization may present the shapes or forms for the features in the requested field-of-view. However, the features are presented with inaccurate or no color information. Also, since the features may be presented with less than all the points defined for those features in the original point cloud, the first visualization may lack much of the visual detail such that the basic shapes and forms of the features are distinguishable.

Client device 201 receives (at 606) the color information and/or other non-positional data for the previously received points, and updates (at 608) the first visualization by modifying the rendering of the received points with the subsequently received (at 606) color information and/or non-positional data. Specifically, client device 201 adds visual detail (e.g., color, transparency, reflectivity, etc.) to the previously rendered points based on the subsequently received (at 606) non-positional data for the previously rendered points.

Streaming system 200 may dynamically adjust the partial data that is streamed for different sets or subsets of points during the adaptive point cloud streaming. In some embodiments, streaming system 200 may send more or less non-positional data with the prioritized points based on changing network conditions and/or available resources.

Figure 7:
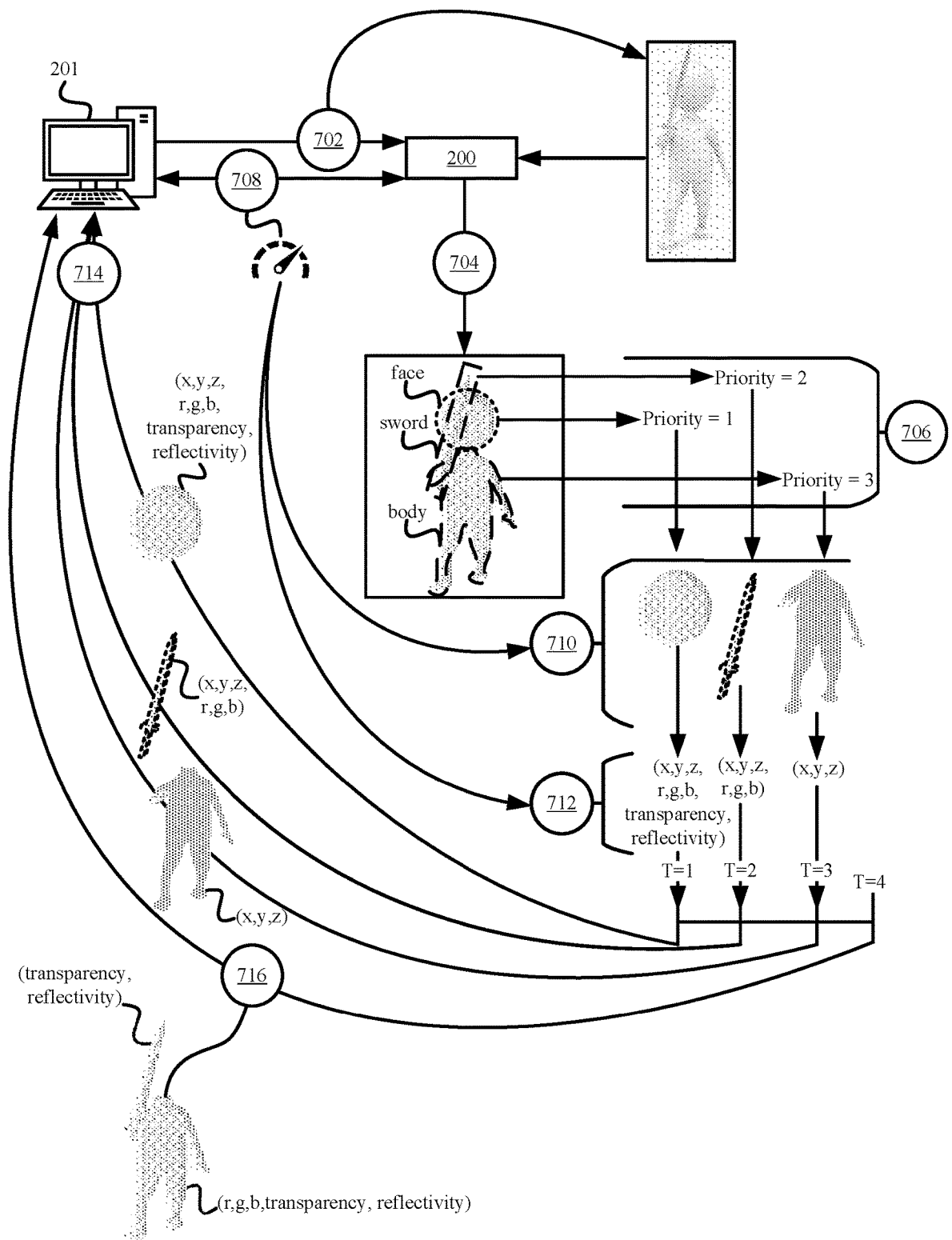
FIG. 7 illustrates an example of adaptive point cloud streaming with dynamic partial data in accordance with some embodiments presented herein.

FIG. 7 illustrates an example of adaptive point cloud streaming with dynamic partial data in accordance with some embodiments presented herein. Streaming system 200 receives (at 702) a request for access to a field-of-view in a point cloud from client device 201.

Streaming system 200 classifies (at 704) the features that are represented by different sets of points in the field-of-view. Streaming system 200 may render the points in the field-of-view and may perform feature recognition in order to classify the features represented by the different set of points. Alternatively, streaming system 200 may map different positional and/or non-positional commonality detected for different sets of points to different classifications or features.

Streaming system 200 determines (at 706) a priority that is associated with each classified feature and/or the set of points that represent that classified feature. In some embodiments, a priority is defined, mapped, or associated with each classification or detected feature.

Streaming system 200 tracks (at 708) network conditions and/or available resources for streaming the point cloud data from streaming system 200 to client device 201 and/or for client device 201 to process and/or render the point cloud data. Streaming system 200 may track (at 708) the network conditions by monitoring various network characteristics such as bandwidth, packet loss, latency, etc. on the network path connecting streaming system 200 to client device 201. Streaming system 200 may monitor the network characteristics by issuing pings or other messages to measure and/or diagnose network performance. Streaming system 200 may track (at 708) the available resources based on the rate at which requests or other feedback messages are issued by client device 201 or based on data or metadata included in the message headers from client device 201.

Streaming system 200 selects (at 710) a subset of the set of points representing each feature to stream based on the tracked (at 708) network conditions and/or available resources. Streaming system 200 selects (at 710) more points to represent each feature in response to tracking (at 708) network conditions that exceed one or more performance thresholds and/or tracking (at 708) available resources that exceed one or more resource thresholds, and fewer points in response to declining or worse network conditions and/or fewer available resources. For instance, streaming system 200 may select (at 710) 100 points from 200 points that represent the outline of a particular feature in response to detecting first network conditions (e.g., bandwidth is greater than 5 Megabits per second), and may select (at 710) 50 points from the 200 points that represent the outline of the particular feature in response to detecting second network conditions that are worse than the first network conditions (e.g., bandwidth of 1 Megabits per second).

Streaming system 200 further selects (at 712) the data to send with each subset of selected (at 710) points based on the determined (at 706) priority for the features represented by those points and/or the tracked (at 708) network conditions. For instance, streaming system 200 selects (at 712) all positional and non-positional data to send with the subset of points selected (at 710) for a feature that represents a character face or that is associated with a first priority, and selects (at 712) the positional data and no non-positional data to send with the subset of points elected (at 710) for a feature that represents an inanimate object or that is associated with a second priority that is less than the first priority. Similarly, streaming system 200 may select (at 712) all positional and non-positional data when tracking (at 708) a first set of network conditions, and may select (at 712) the positional data and no non-positional data when tracking (at 708) a second set of network conditions that are associated with less bandwidth or more latency than the first set of network conditions.

Streaming system 200 streams (at 714) the selected (at 712) data for each selected (at 710) subset of points in an order that is determined from the priority associated with the feature that is represented by that selected (at 710) subset of points. Accordingly, streaming system 200 may transmit more points and/or more data for the points representing a first feature with a first priority, and may transmit fewer points and/or less data for the points representing a second feature with a second priority to client device 201 and/or in response to the request received (at 702) from client device 201. Streaming system 200 may subsequently stream (at 716) the remaining data for the previously streamed (at 714) points and/or data for points that have yet to be streamed if time and/or resources permit.

Figure 8:
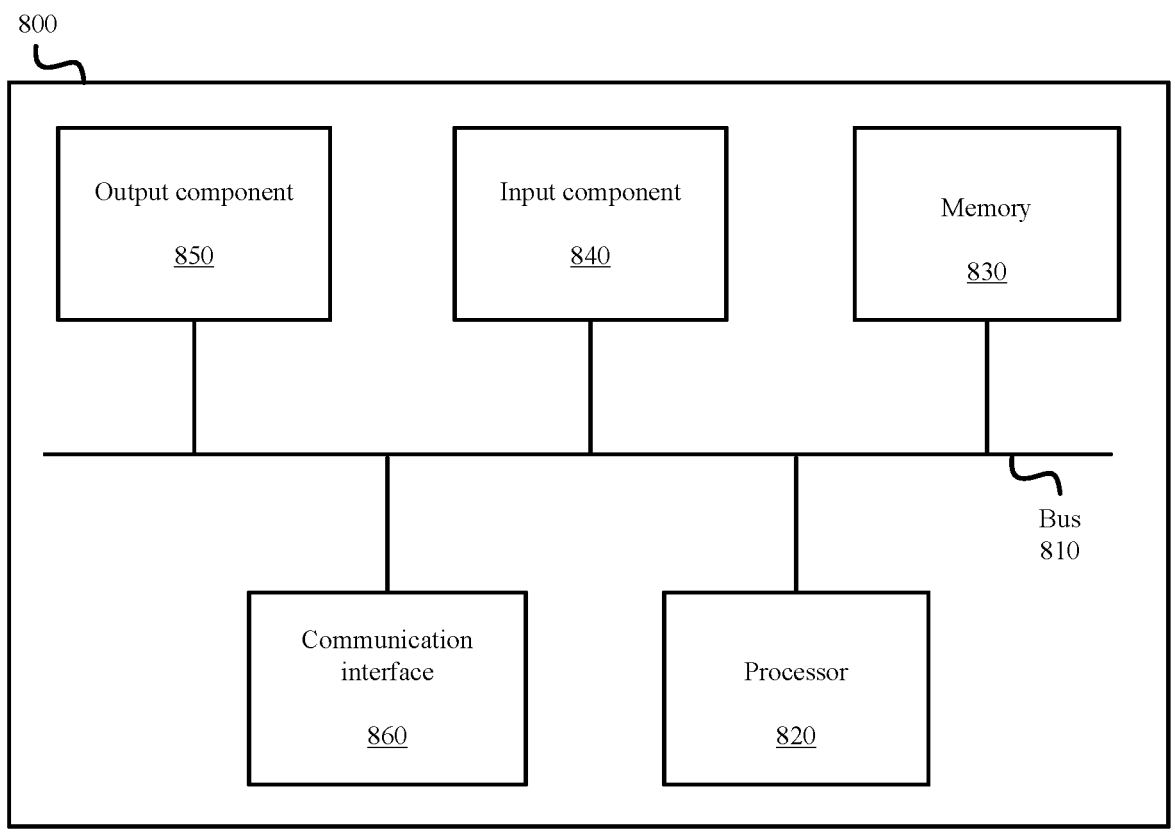
FIG. 8 illustrates example components of one or more devices, according to one or more embodiments described herein.

FIG. 8 is a diagram of example components of device 800. Device 800 may be used to implement one or more of the tools, devices, or systems described above (e.g., streaming system 200, client device 201, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
retrieving a plurality of points that are distributed in a three-dimensional (3D) space of a point cloud;
differentiating a first set of points and a second set of points from the plurality of points based on the first set of points and the second set of points representing different features in the point cloud;
prioritizing the first set of points differently than the second set of points based on a classification of a first feature that is represented by the first set of points and a classification of a second feature that is represented by the second set of points;
selecting a first subset of points from the first set of points that preserve unique first details of the first feature without all points from the first set of points;
selecting a second subset of points from the second set of points that preserve unique second details of the second feature without all points from the second set of points; and
presenting the unique first details of the first feature and the unique second details of the second feature before presenting other parts of the first feature and the second feature by streaming the first subset of points and the second subset of points across a data network to a client device in an order that is determined from said prioritizing.

2. The method of claim 1,
wherein selecting the first subset of points that preserve the unique first details of the first feature comprises selecting points from the first set of points based on first selection criteria that are associated with the classification of the first feature,
wherein selecting the second subset of points that preserve the unique second details of the second feature comprises selecting points from the second set of points based on different second selection criteria that are associated with the classification of the second feature, and wherein presenting the unique first details and the unique second details comprises:
streaming the first subset of points and the second subset of points to the client device at a first time; and
streaming remaining points from the first set of points that are not selected as part of the first subset of points at a second time after the first time.

3. The method of claim 1 further comprising:
classifying the first feature that is represented by the first set of points;
classifying the second feature that is represented by the second set of points;
wherein selecting the first subset of points comprises identifying the unique first details based on first selection criteria associated with the first feature;
wherein selecting the second subset of points comprises identifying the unique second details based on second selection criteria associated with the second feature; and
wherein presenting the unique first details and the unique second details comprises:
streaming the second subset of points before the first subset of points based on the second set of points being prioritized before the first set of points.

4. The method of claim 1, wherein each particular point of the plurality of points is defined with a first plurality of values for a position of the particular point in the 3D space and with a second plurality of values for visual characteristics of the particular point.

5. The method of claim 4, wherein streaming the first subset of points comprises:
streaming the first plurality of values for the first subset of points without the second plurality of values at a first time; and
streaming the second plurality of values for the first subset of points without the first plurality of values at a second time that is after the first time.

6. The method of claim 4, wherein streaming the first subset of points comprises:
selecting a first subset of values from the first plurality of values and the second plurality of values for the first subset of points based on the first set of points representing a first feature; and
distributing the first subset of values for the first subset of points at a first time, wherein the first subset of values comprises less than all values from the first plurality of values and the second plurality of values.

7. The method of claim 6, wherein streaming the first subset of points further comprises:
distributing the first subset of points with other values from the first plurality of values and the second plurality of values that were not included in the first subset of values at a second time that is after the first time.

8. The method of claim 1 further comprising:
determining network conditions for a network path to the client device; and
wherein selecting the first subset of points comprises:
selecting a first number of points from the first set of points to stream to the client device at a particular time based on the network conditions satisfying a threshold; and
selecting a second number of points from the first set of points to stream to the client device at the particular time based on the network conditions not satisfying the threshold, wherein the second number of points is less than the first number of points.

9. The method of claim 1 further comprising:
determining network conditions for a network path to the client device; and
wherein selecting the first subset of points comprises:
adjusting selecting criteria that is used in selecting points from the first of points that preserve the unique first details.

10. The method of claim 1, wherein prioritizing the first set of points differently than the second set of points comprises:
assigning a different priority value to the first set of points than to the second set of points based on the different priority value assigned to the first set of points being associated with the first feature and the different priority value assigned to the second set of points being associated with the second feature.

11. The method of claim 1, wherein streaming the first subset of points and the second subset of points comprises:
transmitting data for the first subset of points before data for the second subset of points based on the first feature that is represented by the first set of points being associated with a higher priority than the second feature that is represented by the second set of points.

12. The method of claim 1 further comprising:
determining network conditions for a network path to the client device; and
wherein streaming the first subset of points and the second subset of points comprises:
transmitting a first amount of data that is defined for each point of the first and second subsets of points at a particular time based on the network conditions satisfying a threshold; and
transmitting a second amount of data that is defined for each point of the first and second subsets of points at the particular time based on the network conditions not satisfying the threshold, wherein the second amount of data comprises less data than the first amount of data and all data that is defined for a point.

13. The method of claim 1 further comprising:
receiving input that changes a current field-of-view comprising the plurality of points to a new field-of-view comprising different points than the plurality of points; and
streaming the different points in the new field-of-view in place of other points from the first set of points that were not included in the first subset of points and other points from the second set of points that were not included in the second subset of points.

14. A streaming system comprising:
one or more hardware processors configured to:
retrieve a plurality of points that are distributed in a three-dimensional (3D) space of a point cloud;
differentiate a first set of points and a second set of points from the plurality of points based on the first set of points and the second set of points representing different features in the point cloud;
prioritize the first set of points differently than the second set of points based on a classification of a first feature that is represented by the first set of points and a classification of a second feature that is represented by the second set of points;
select a first subset of points from the first set of points that preserve unique first details of the first feature without all points from the first set of points;

select a second subset of points from the second set of points that preserve unique second details of the second feature without all points from the second set of points; and present the unique first details of the first feature and the unique second details of the second feature before presenting other parts of the first feature and the second feature by streaming the first subset of points and the second subset of points across a data network to a client device in an order that is determined from said prioritizing.

15. The streaming system of claim 14, wherein selecting the first subset of points that preserve the unique first details of the first feature comprises selecting select a different subset of points from the first set of points based on first selection criteria that are associated with the classification of the first feature, wherein selecting the second subset of points that preserve the unique second details of the second feature comprises selecting points from the second set of points based on different second selection criteria that are associated with the classification of the second feature, and wherein presenting the unique first details and the unique second details comprises:

streaming the first subset of points and the second subset of points to the client device at a first time; and streaming remaining points from the first set of points that are not selected as part of the first subset of points at a second time after the first time.

16. The streaming system of claim 14, wherein the one or more hardware processors are further configured to:

classify the first feature that is represented by the first set of points;

classify the second feature that is represented by the second set of points;

wherein selecting the first subset of points comprises identifying the unique first details based on first selection criteria associated with the first feature;

wherein selecting the second subset of points comprises identifying the unique second details based on second selection criteria associated with the second feature; and wherein presenting the unique first details and the unique second details comprises:

streaming the second subset of points before the first subset of points based on the second set of points being prioritized before the first set of points.

17. The streaming system of claim 14, wherein each particular point of the plurality of points is defined with a first plurality of values for a position of the particular point in the 3D space and with a second plurality of values for visual characteristics of the particular point.

18. The streaming system of claim 17, wherein streaming the first subset of points comprises:

streaming the first plurality of values for the first subset of points without the second plurality of values at a first time; and streaming the second plurality of values for the first subset of points without the first plurality of values at a second time that is after the first time.

19. The streaming system of claim 17, wherein streaming the first subset of points comprises:

selecting a first subset of values from the first plurality of values and the second plurality of values for the first subset of points based on the first set of points representing a first feature; and distributing the first subset of values for the first subset of points at a first time, wherein the first subset of values comprises less than all values from the first plurality of values and the second plurality of values.

20. A non-transitory computer-readable medium storing instructions that, when executed by one or more processors of a streaming system, cause the streaming system to perform operations comprising:

retrieving a plurality of points that are distributed in a three-dimensional (3D) space of a point cloud;

differentiating a first set of points and a second set of points from the plurality of points based on the first set of points and the second set of points representing different features in the point cloud;

prioritizing the first set of points differently than the second set of points based on a classification of a first feature that is represented by the first set of points and a classification of a second feature that is represented by the second set of points;

selecting a first subset of points from the first set of points that preserve unique first details of the first feature without all points from the first set of points;

selecting a second subset of points from the second set of points that preserve unique second details of the second feature without all points from the second set of points; and presenting the unique first details of the first feature and the unique second details of the second feature before presenting other parts of the first feature and the second feature by streaming the first subset of points and the second subset of points across a data network to a client device in an order that is determined from said prioritizing.

* * * * *